United States Patent
Fan et al.

(10) Patent No.: US 7,965,421 B2
(45) Date of Patent: Jun. 21, 2011

(54) SHOW-THROUGH REDUCTION METHOD AND SYSTEM

(75) Inventors: Zhigang Fan, Webster, NY (US);
Reiner Eschbach, Webster, NY (US);
Martin S. Maltz, Rochester, NY (US);
Judith Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 563 days.

(21) Appl. No.: 12/103,978

(22) Filed: Apr. 16, 2008

(65) Prior Publication Data

US 2009/0262402 A1 Oct. 22, 2009

(51) Int. Cl.
*H04N 1/40* (2006.01)
(52) U.S. Cl. ............... 358/3.26; 358/1.18; 358/474
(58) Field of Classification Search ............ 358/1.9, 358/2.1, 3.24–3.26, 1.12, 1.18, 505, 408, 358/448, 474, 496–497
See application file for complete search history.

(56) References Cited

U.S. PATENT DOCUMENTS

| | | | |
|---|---|---|---|
| 4,673,285 A | 6/1987 | Shogren | |
| 4,734,742 A | 3/1988 | Klumpp et al. | |
| 4,743,974 A | 5/1988 | Lockwood | |
| 4,967,233 A | 10/1990 | Buchar | |
| 5,463,451 A * | 10/1995 | Acquaviva et al. | 399/211 |
| 5,646,744 A | 7/1997 | Knox | |
| 6,101,283 A | 8/2000 | Knox | |
| 6,227,725 B1 * | 5/2001 | Ancin et al. | 358/1.9 |
| 6,288,798 B1 | 9/2001 | Sharma | |
| 6,877,659 B2 * | 4/2005 | Abramsohn | 235/454 |
| 7,145,697 B1 | 12/2006 | Sharma et al. | |
| 7,773,273 B2 * | 8/2010 | Jeong | 358/474 |

OTHER PUBLICATIONS

Gonzalez, Rafael C., Richard E. Woods, Digital Image Processing, pp. 518-519, 549, Addison-Wesley Publishing Company, Inc., (US) 1992.

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A show-through reduction method is disclosed. The method is designed to deal with both light and severe show-through. The method focuses mostly on text documents, with characters possibly appearing in multiple gray levels, although the method can also be extended to color documents. As in the prior art, the front and back pages are processed in pairs. However, no perfect page alignment is assumed here, since we are dealing with real images. Instead, a front and back registration is performed as the first step before the pages are further analyzed. In this method, we are aligning the front page content with its show-through appearing in the back side, and the back page content with its show-through appearing in the front side. Once the two sides are aligned, masks are generated for both sides to differentiate severe show-through and light color content regions. Finally, different TRCs are applied to different regions. The show-through is reduced and the page contents are retained.

20 Claims, 3 Drawing Sheets

SHOW-THROUGH REDUCTION METHOD AND SYSTEM

BACKGROUND

The exemplary embodiments disclosed herein are directed to document scanning and printing methods and systems that reduce show-through of images from a back side of a translucent document.

When a user wishes to reproduce an image on an image bearing substrate or obtain an electronic version of the image on the document, the image is passed within a detection field of an optical sensor. The passing of the document image within the detection field of the optical sensor is termed "scanning" the document. The optical sensor detects light reflected from the surface of the document and obtains data representing the reflected light. The data obtained is an electronic representation of the images formed on the document, because the colors and shadings of the images reflect different amounts and wavelengths of light.

When a double-sided translucent image bearing substrate, having images on both sides of the image bearing substrate, is scanned, the electronic representation generated by scanning one side of the image bearing substrate will contain information from both sides of the image bearing substrate due to light passing through the image bearing substrate. The high contrast image information of the scanned side, or front, of the image bearing substrate will be combined with the low contrast image information from the back side of the image bearing substrate. This low contrast image information from the back side of the image bearing substrate is called "show-through" image information. The elimination of residual signature in the scan of the back side and the adjacent document is the problem to be overcome by the subject development.

One way in which show-through image information is reduced is to place a black backing on the back side of the image bearing substrate during scanning. The light that passes through the image bearing substrate is absorbed by the black backing. Although there is a significant reduction of the show-through image information, there is a small residual low contrast image of the back side remaining in the scanned image due to light scattering off the back side of the image bearing substrate. This method is undesirable because with a black backing any perforations in the image bearing substrate and regions beyond the edges of the image bearing substrate appear as black regions in the scanned image. Additionally, trying to insert such a backing for book scanning is particularly inconvenient and undesirable.

One-dimensional Tone Reproduction Curves (TRCs) may be used in the digital imaging process as a means for compensating for non-linearities introduced by an individual imaging device. In general, the same TRC is used for each pixel in an image. Conventionally, one TRC is used for each of the colorants, i.e., four TRCs in the case of a CMYK process color marking device, a single TRC for a monochrome (single color) device. The TRCs can be periodically refined by printing calibration patches on the imaging device, comparing the measured color of each of the calibration patches with that of respective reference colors, and modifying the TRCs to achieve a closer correlation between the printed calibration patches and reference colors.

In this regard, another method performs aggressive page background suppression after the document is scanned. It applies a TRC that maps light gray into page background white. While it can effectively eliminate most of the show-through, which are light gray in color, it may fail to remove severe show-through that is relatively dark. An even more aggressive TRC may do the job, but it will raise the risk of eliminating light color content printed in the front page.

Yet another method assumes that both front and back pages are scanned and that both are available during processing. Each page is analyzed with a model that predicts show-through physics. The page is decomposed into a content part and a show-through part and the latter is discarded. This type of method in principal can treat all kinds of show-through. However, they are often computationally very complicated. The accuracy of decomposition relies heavily on the validity of the model. Furthermore, they require that the front and the back sides of the pages are perfectly aligned, a condition in reality seldom met.

Thus, the exemplary embodiments contemplate new and improved method and systems that resolve the above-referenced difficulties and others.

BRIEF DESCRIPTION

In one aspect of the exemplary embodiments, a digital image processing method is provided. The method comprises: scanning a two-sided document to generate a front digital image containing a plurality of objects and a back digital image containing a plurality of objects, wherein the scanning process introduces a relative shift of the objects in the images; performing front-back registration of the digital images; generating a mask for each digital image; and applying one or more sets of tone reproduction curves to different regions of the images to produce an output document with reduced show-through.

In another aspect of the exemplary embodiments, a digital image processing system is provided. The system comprises an image input device comprising a scanning station for scanning a two-sided document and generating a front digital image containing a plurality of objects and a back digital image containing a plurality of objects, wherein the scanning process introduces a relative shift of the objects in the images; an image processing device for performing front-back registration of the digital images, generating a mask for each digital image, and applying one or more sets of tone reproduction curves to different regions of the images to produce an output document with reduced show-through; a text and graphics document storage device connected to the image processing device via a network connection; and an image data output device for reproduction of documents in hard copy.

In yet another aspect of the exemplary embodiments, a computer program product is provided. The product comprises: a computer-usable data carrier storing instructions that, when executed by a computer, cause the computer to perform a method comprising: scanning a two-sided document to generate a front digital image containing a plurality of objects and a back digital image containing a plurality of objects, wherein the scanning process introduces a relative shift of the objects in the images; performing front-back registration of the digital images by aligning the front digital image with its show-through on the opposite side; generating a mask for each digital image; applying one or more sets of tone reproduction curves to different regions of the images to produce an output document with reduced show-through; and storing or printing the output document.

DETAILED DESCRIPTION

Figure 1:
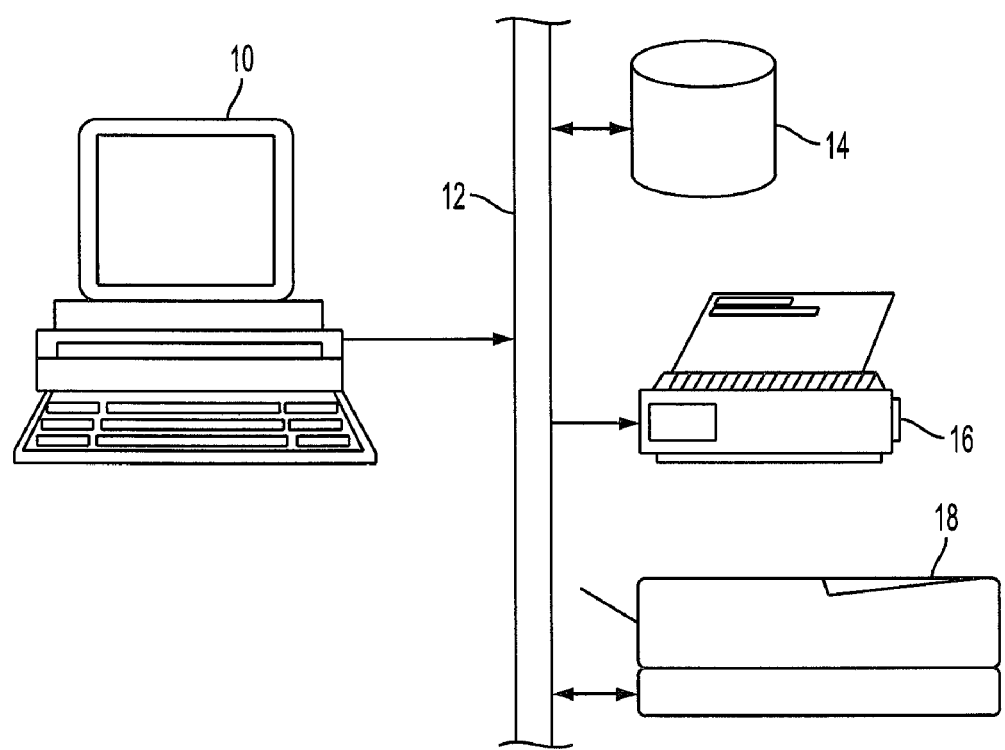
FIG. 1 is shows a document processing system in which the exemplary embodiments can be implemented.

As used herein, the term "data" refers generally to physical signals that indicate or include information. We are primarily concerned with providing a description of "duplex" documents, i.e., original documents with images on both sides thereof. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image. Although most book scanning primarily involves black and white text, the exemplary embodiments are applicable to color images causing the undesired show-through effects. Extension to color on a per channel basis is straightforward from the exemplary embodiments discussed herein.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to gray-scale continuous-tone processing, the exemplary embodiment applies equally as well to the processing of color images, wherein each separation is treated, effectively, as a gray-scale continuous-tone image. Accordingly, references herein to the processing of continuous-tone (contone) gray-scale images is intended to include the processing of color image separations as well. An operation typically performs "image processing" when it operates on an item of data that relates to part of an image.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

FIG. 1 shows an image processing device 10, connected via a network connection 12 to a text and graphics document storage device 14. The image processing device 10 may also be associated with an image input device such as a scanning system 16. The computer workstation may be associated with an image data output device (or printing system) 18 for reproduction of documents in hard copy.

The image processing device 10 is any type of device that is capable of receiving the image data and supplying adjusted image data to the image data output device 18. For example, the image processing device 10 may be a computer, a microprocessor, a scanner processor, a disk drive, a tape drive, a hard disk, zip drive, CD-ROM drive, DVD drive, a network server, a print server, photocopying device or any other known or later developed device or system that is able to receive and provide image data. The image processing device 10 may include a plurality of components including displays, user interfaces, memories, disk drives, and the like. For simplicity of the following description of the exemplary embodiments, it will be assumed that the image processing device 10 is a personal computer.

The image output device 18 is any type of device that is capable of outputting an image. For example, the image output device 18 may be a laser printer, bubble jet printer, ink jet printer, photocopying machine, or any other known or later developed device or system that is able to generate an image on a recording medium or display an image using image data or data generated from the image data. The image output device 18 generates an image based on the adjusted image data from the image processing device 10. While FIG. 1 shows a single image output device 18, multiple image output devices 18 may be coupled to the image processing device 10.

The processing steps that will be described herein may take place either on the image processing device 10 or at a server or processor associated with the storage device 14. As another alternative, the processing described may take place within the scanner itself, or at the output device 18, if they are equipped with the appropriate processors. This may well be the case in the situation of a digital copier, which is equivalent to the computer/scanner/printer combination described herein.

Figure 2:
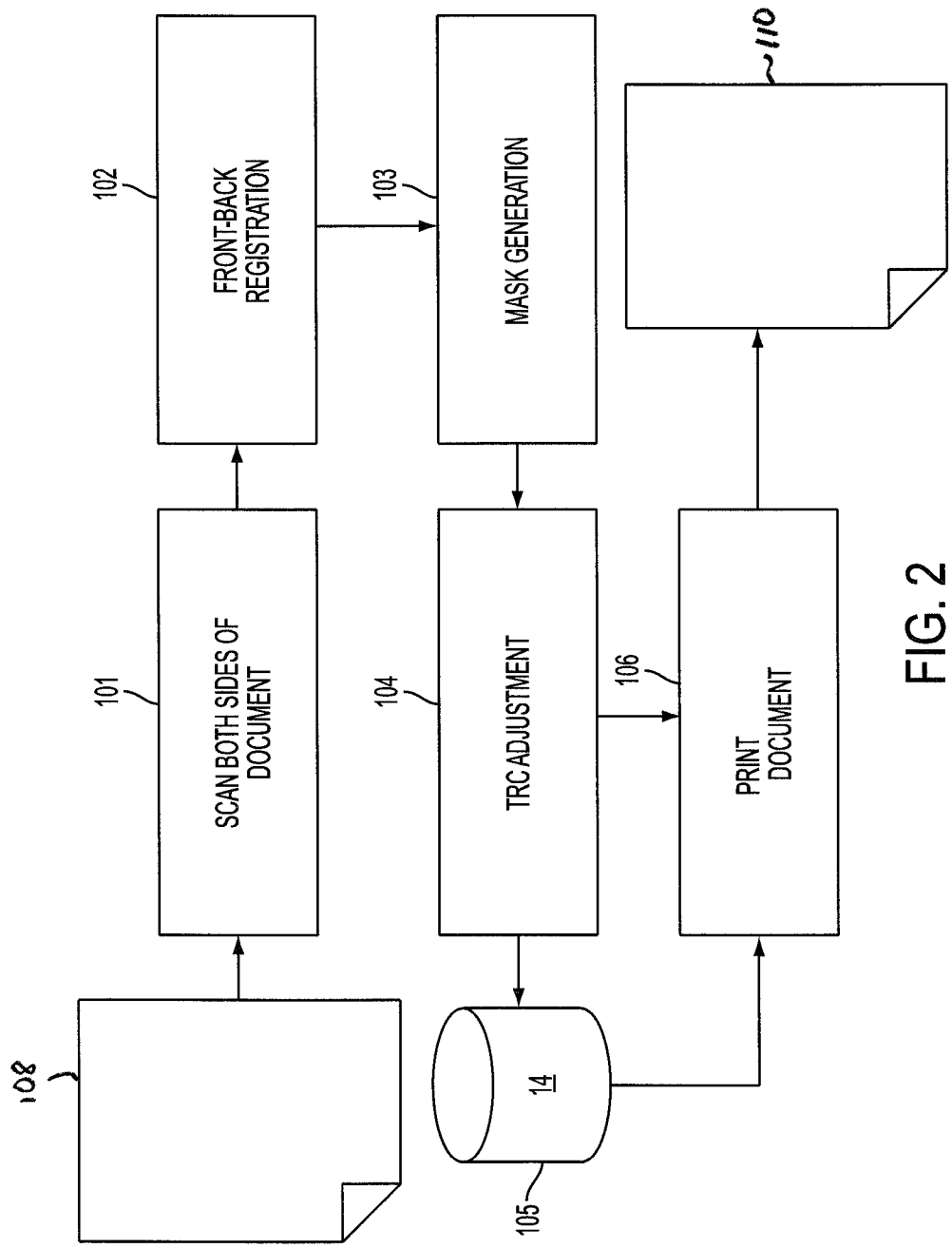
FIG. 2 is a flowchart outlining an exemplary embodiment of a method for reducing show-through in a document.

Given the possibility of show-through in a printed duplex document that was originally scanned in, a show-through reduction method using adaptive TRC adjustment may be implemented. The exemplary method is illustrated in FIG. 2. As shown in the figure, the method includes: scanning a two-sided document (101), performing front-back registration of the two pages (102), generating a mask for each page (103), adjusting the TRCs for the document (104), and storing (105) and/or printing (106) the document.

Initially, both sides of an input document 108 are scanned using the scanner 16 to generate a pair of digital images or pages (not shown) (101). The well known process of duplex scanning is described, for example, in U.S. Pat. No. 6,101,283 to Knox, the disclosure of which is incorporated by reference in its entirety. Reference is also made to U.S. Pat. No. 4,743, 974 to Lockwood, and U.S. Pat. No. 4,967,233 to Buchar et al., which describe an example duplex image. Similar problems would be noted in the arrangements described in U.S. Pat. No. 4,673,285 to Shogren, U.S. Pat. No. 4,734,742 to Klumpp et al. Show-through can be a problem in any scanner, simplex or duplex. Thus, before storing or printing the duplex document, processing of the digital image is to be performed.

The procedure of front-back registration (102) involves aligning the page content with its (possible) show-though on the other side of the page. This procedure is accomplished in two stages, the first stage involving "thresholding" the pages.

Thresholding is the simplest method of image segmentation. Individual pixels in a grayscale image are marked as "object" pixels if their value is greater than some threshold value (assuming an object to be brighter than the background)

and as "background" pixels otherwise. The key parameter in thresholding is obviously the choice of the threshold.

In this case, the objects of both pages are first thresholded into at least four regions: black objects, dark objects, gray objects, and white objects (i.e., darkest to lightest). White objects contain pixels that are almost certainly background. Both black objects and dark objects are almost certainly text. Their difference is that a black object may be dark enough to cause show-though while a dark object is generally not. The gray class is the most ambiguous one. It could be light color text or show-through (caused by the black object on the other side of the paper). The thresholds may be determined empirically.

There is generally a relative shift of the objects on the pages caused by the scanning process (i.e., misregistration). Therefore, once the two pages are thresholded, the front and back of each page are aligned by adjusting their relative translations, although relative rotation and scaling can also be compensated in a similar manner. They are typically small for the documents scanned with a page feeder. The translation parameter (m,n) is generally computed as:

$$m, n = \arg_{m,n} \min \left\{ \sum_{i,j} E[f(i, j), b(W - i + m, j + n)] + \sum_{i,j} E[b(i, j), f(W - i - m, j - n)] \right\}$$

where f(i,j) and b(i,j) are the (i,j)-th pixel of the front and back pages, respectively, W is the page width, and the function E(x, y) is defined as:

$E(x,y)=1$, if $x$=gray and $y\neq$black;

0, otherwise

In other words, the above procedure attempts to match the gray pixels on one page to the black pixels on the mirrored image of the opposite page.

Next, two masks, each with the same size as a page, are generated—one for the front page and one for the back page (103). A pixel mask(i,j) of a mask may contain one of three values:

0, if pixel (i,j) of the page is not gray;
mask(i,j)=1, if pixel (i,j) of the page is gray and pixel (W−i−m, j+n) (which is the pixel after alignment) at the opposite page is NOT black;
2, if pixel (i,j) of the page is gray and pixel (W−i−m, j+n) (after alignment) at the opposite page is black.

Conceivably pixel (i,j) appears to be a part of a light color text if mask(i,j)=1, and a part of show-through if mask(i,j)=2. After they are generated, the masks are modified by dilating the regions where mask(i,j)=1. The purpose of the dilation can be explained as follows. Suppose there is some light color text in the front page and its corresponding area in the back page is black text. According to the above procedure, the mask value for the area (in the front page) will be 2, and the light color text will be treated as show-through. This misclassification will cause elimination of the light text. The dilation of the "1" areas may prevent or reduce the problem. It should be noted that the light color text in the front and the black text in the back are not likely matched exactly. In other words, the mask associated with the light text is typically not pure 2s, but rather a mixture of 1s and 2s. Dilating "1" areas will reduce the mislabeling of "1" to "2". The dilation operation enlarges the boundaries of areas. It can be implemented by the well known process of mathematical morphology. See, for example, R. Gonzalez and R. Woods, *Digital Image Processing*, Addison-Wesley Publishing Company, 1992, pp 518-519, 549. This may of course increase the risk of mislabeling "2" to "1" and failing to eliminate some show-through if they are neighboring light color text. However, this is typically a less fatal error.

Two sets of TRC's are then applied to different regions of the pages (104). The more aggressive TRC is used in pixels associated with m(i,j)=1. It eliminates the show-though. In other regions, a (relatively) less aggressive TRC performs page background suppression while retaining light color text. The TRCs can be determined empirically.

Finally, the pages may be stored (105) in the database 14 or printed (106) via the image output device 18 to produce one or more output documents 110.

Figure 3:
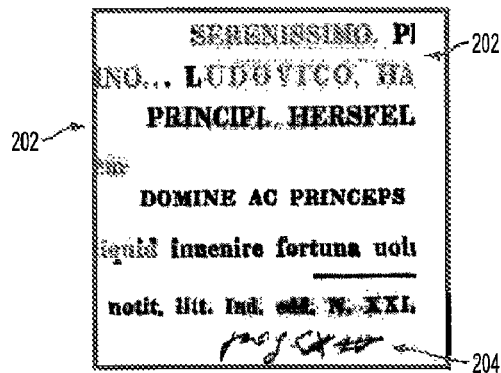
FIG. 3 shows an original scanned image (cropped)
Figure 4:
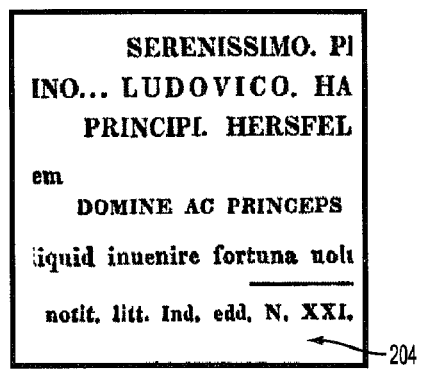
FIG. 4 shows an image that has been processed using the conventional method.
Figure 5:
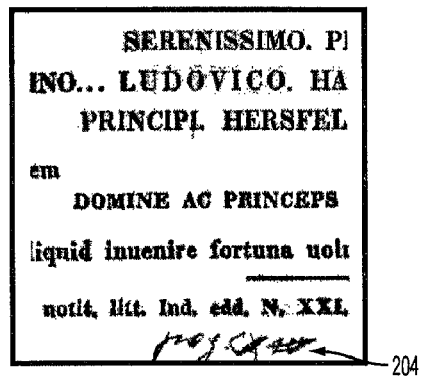
FIG. 5 shows an image that was generated by an exemplary embodiment of the method for reducing show-through in a document.

The exemplary method has been tested. FIGS. 3-5 show one example. FIG. 3 shows the original image (cropped) with some show-through 202 and some handwritten notes 204, which are not show-through. The image in FIG. 4 was processed using the conventional method. The show-through has been removed, but it also partially deleted the light handwriting 204. The image in FIG. 5 was generated by the exemplary method, which eliminated the show-through while retaining the light text 204.

Accordingly, a new show-through reduction method is disclosed. The method is designed to deal with both light and severe show-through. The method focuses mostly on text documents, with characters possibly appearing in multiple gray levels, although the method can also be extended to color documents. As in the prior art, the front and back pages are processed in pairs. However, no perfect page alignment is assumed here, since we are dealing with real images. Instead, a front and back registration is performed as the first step before the pages are further analyzed. The registration is particularly challenging, as the alignment information can only be derived from the relative positions of the page content and its (possible) show-though at the other side of the page. More specifically, we are aligning the front page content with its show-through appearing in the back side, and the back page content with its show-through appearing in the front side. The conventional matching/aligning algorithms cannot be applied here as they tend to match the contents of both pages. A novel front-back registration algorithm was created to solve the problem. Once the two sides are aligned, masks are generated for both sides to differentiate severe show-through and light color content regions. Finally, different TRCs are applied to different regions. The show-through is reduced and the page contents are retained.

Portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A digital image processing method comprising:
    scanning a two-sided document to generate a front digital image containing a plurality of objects and a back digital image containing a plurality of objects, wherein the scanning process introduces a relative shift of the objects in the images;
    performing front-back registration of the digital images;
    generating a mask for each digital image; and
    applying at least two different sets of tone reproduction curves to different regions of the images to produce an output document with reduced show-through.

2. The method of claim 1, further comprising:
    storing or printing the output document.

3. The method of claim 1, wherein performing front-back registration further comprises:
    aligning the front digital image with its show-through on the opposite side.

4. The method of claim 3, further comprising:
    thresholding the objects in each image into one of a plurality of object regions ranging from darkest to lightest; and
    aligning the front and back images by adjusting their relative translations according to a translation parameter to correct the relative shift caused by scanning.

5. The method of claim 4, wherein the plurality of object regions includes black objects, dark objects, gray objects, and white objects.

6. The method of claim 5, wherein the translation parameter (m,n) is computed as:

$$m, n = \arg_{m,n} \min \left\{ \sum_{i,j} E[f(i, j), b(W - i + m, j + n)] + \sum_{i,j} E[b(i, j), f(W - i - m, j - n)] \right\}$$

where f(i,j) and b(i,j) are the (i,j)-th pixel of the front and back images,
respectively, W is the page width, and the function E(x, y) is defined as:

$E(x,y)=1$, if $x$=gray and $y \neq$ black;

0, otherwise.

7. The method of claim 6, wherein a pixel mask(i,j) of a mask may contain one of three values:
    0, if pixel (i,j) of the image is not gray;
    mask(i,j)=1, if pixel (i,j) of the image is gray and pixel (W−i−m, j+n) (which is the pixel after alignment) at the opposite page is NOT black;
    2, if pixel (i,j) of the page is gray and pixel (W−i−m, j+n) (after alignment) at the opposite page is black.

8. The method of claim 7, wherein a more aggressive tone reproduction curve is used in pixels associated with m(i,j)=1 to eliminate the show-though, and in other regions a less aggressive tone reproduction curve performs page background suppression while retaining light color text.

9. A digital image processing system comprising:
    an image input device comprising a scanning station for scanning a two-sided document and generating a front digital image containing a plurality of objects and a back digital image containing a plurality of objects, wherein the scanning process introduces a relative shift of the objects in the images;
    an image processing device for performing front-back registration of the digital images, generating a mask for each digital image, and applying at least two different sets of tone reproduction curves to different regions of the images to produce an output document with reduced show-through;
    a text and graphics document storage device connected to the image processing device via a network connection; and
    an image data output device for reproduction of documents in hard copy.

10. The system of claim 9, wherein the image processing device comprises one or more of a computer, a microprocessor, a scanner processor, a disk drive, a tape drive, a hard disk, zip drive, CD-ROM drive, DVD drive, a network server, a print server, and a photocopying device.

11. The system of claim 9, wherein the image output device comprises a laser printer, a bubble jet printer, an ink jet printer, or a photocopying machine.

12. The system of claim 9, wherein the image processing device is further operative to align the front digital image with its show-through on the opposite side.

13. The system of claim 12, wherein the image processing device is further operative to:
threshold the objects into one of a plurality of object regions ranging from darkest to lightest; and
align the front and back images by adjusting their relative translations according to a translation parameter to correct the relative shift caused by scanning.

14. The system of claim 13, wherein the plurality of object regions includes black objects, dark objects, gray objects, and white objects.

15. The system of claim 14, wherein the translation parameter (m,n) is computed as:

$$m, n = \arg_{m,n} \min \left\{ \sum_{i,j} E[f(i, j), b(W - i + m, j + n)] + \sum_{i,j} E[b(i, j), f(W - i - m, j - n)] \right\}$$

where f(i,j) and b(i,j) are the (i,j)-th pixel of the front and back images, respectively, W is the page width, and the function E(x, y) is defined as:

$E(x,y)=1$, if $x$=gray and $y \neq$ black;

0, otherwise.

16. The system of claim 15, wherein a pixel mask(i,j) of a mask may contain one of three values:
0, if pixel (i,j) of the image is not gray;
mask(i,j)=1, if pixel (i,j) of the image is gray and pixel (W−i−m, j+n) (which is the pixel after alignment) at the opposite page is NOT black;
2, if pixel (i,j) of the page is gray and pixel (W−i−m, j+n) (after alignment) at the opposite page is black.

17. The system of claim 16, wherein a more aggressive tone reproduction curve is used in pixels associated with m(i,j)=1 to eliminate the show-though, and in other regions a less aggressive tone reproduction curve performs page background suppression while retaining light color text.

18. A computer program product comprising:
a non-transitory computer-usable data carrier storing instructions that, when executed by a computer, cause the computer to perform a method comprising:
scanning a two-sided document to generate a front digital image containing a plurality of objects and a back digital image containing a plurality of objects, wherein the scanning process introduces a relative shift of the objects in the images;
performing front-back registration of the digital images by aligning the front digital image with its show-through on the opposite side;
generating a mask for each digital image;
applying at least two different sets of tone reproduction curves to different regions of the images to produce an output document with reduced show-through; and
storing or printing the output document.

19. The product of claim 18, wherein the plurality of object regions includes black objects, dark objects, gray objects, and white objects.

20. The product of claim 18, wherein the translation parameter (m,n) is computed as:

$$m, n = \arg_{m,n} \min \left\{ \sum_{i,j} E[f(i, j), b(W - i + m, j + n)] + \sum_{i,j} E[b(i, j), f(W - i - m, j - n)] \right\}$$

where f(i,j) and b(i,j) are the (i,j)-th pixel of the front and back images, respectively, W is the page width, and the function E(x, y) is defined as:

$E(x,y)=1$, if $x$=gray and $y \neq$ black;

0, otherwise.

* * * * *